(12) United States Patent
Bahar et al.

(10) Patent No.: US 12,180,346 B2
(45) Date of Patent: Dec. 31, 2024

(54) ANION EXCHANGE IONOMER WITH A POYARYLENE BACKBONE AND ANION EXCHANGE MEMBRANE INCORPORATING SAME

(71) Applicant: Xergy Inc., Harrington, DE (US)

(72) Inventors: Bamdad Bahar, Georgetown, DE (US); Taoli Gu, San Jose, CA (US); Sai Nitin Yellamilli, Milford, DE (US)

( * ) Notice: Subject to any disclaimer, the term of this patent is extended or adjusted under 35 U.S.C. 154(b) by 808 days.

(21) Appl. No.: 17/366,689

(22) Filed: Jul. 2, 2021

(65) Prior Publication Data

US 2021/0347956 A1   Nov. 11, 2021

Related U.S. Application Data

(63) Continuation-in-part of application No. 16/913,767, filed on Jun. 26, 2020, now Pat. No. 11,969,722, and a continuation-in-part of application No. 16/789,346, filed on Feb. 12, 2020, now Pat. No. 11,552,320.

(60) Provisional application No. 63/047,808, filed on Jul. 2, 2020, provisional application No. 62/867,146, filed on Jun. 26, 2019, provisional application No. 62/804,634, filed on Feb. 12, 2019.

(51) Int. Cl.
*B01D 53/22* (2006.01)
*C08J 5/22* (2006.01)

(52) U.S. Cl.
CPC ......... *C08J 5/2293* (2013.01); *C08J 2327/18* (2013.01)

(58) Field of Classification Search
CPC ........................... C08J 5/2293; C08J 2327/18
See application file for complete search history.

(56) References Cited

U.S. PATENT DOCUMENTS

| | | | | |
|---|---|---|---|---|
| 7,671,157 B2 * | 3/2010 | Bae | ......................... | C08G 75/23 |
| | | | | 528/8 |
| 9,051,431 B2 * | 6/2015 | Kim | ....................... | C08G 75/20 |
| 10,272,424 B2 * | 4/2019 | Bae | ........................... | C08F 8/04 |
| 10,435,504 B2 * | 10/2019 | Bae | ........................ | A01N 29/00 |
| 11,040,339 B2 * | 6/2021 | Bae | ..................... | H01M 8/1023 |
| 11,173,456 B2 * | 11/2021 | Bahar | ..................... | C08G 10/00 |
| 11,286,337 B2 * | 3/2022 | Bae | ........................ | C09D 165/00 |
| 11,339,996 B2 * | 5/2022 | Bahar | ....................... | C25B 9/23 |
| 11,465,139 B2 * | 10/2022 | Lee | ......................... | C08J 5/2243 |
| 2012/0141919 A1 * | 6/2012 | Lee | ..................... | H01M 4/8663 |
| | | | | 429/535 |
| 2014/0271774 A1 * | 9/2014 | Drumheller | ............. | A61L 31/10 |
| | | | | 522/167 |
| 2015/0188175 A1 * | 7/2015 | Pearman | ................. | H01M 4/92 |
| | | | | 429/480 |
| 2017/0252707 A1 * | 9/2017 | Bahar | ................. | H01M 8/1069 |
| 2017/0355811 A1 * | 12/2017 | Bae | ..................... | H01M 8/1072 |
| 2021/0108067 A1 * | 4/2021 | Bae | ......................... | B01D 69/02 |
| 2021/0249675 A1 * | 8/2021 | Kim | ......................... | B01D 69/02 |
| 2021/0309818 A1 * | 10/2021 | Bae | ........................ | C08F 293/00 |
| 2021/0380771 A1 * | 12/2021 | Bae | ......................... | C08J 5/2243 |
| 2022/0052357 A1 * | 2/2022 | Bae | ............................ | C08J 5/22 |

(Continued)

Primary Examiner — Anthony R Shumate

(57) ABSTRACT

An anion exchange ionomer is disclosed that contains a fluorinated, ether-free backbone, and a fluorinated ether based quaternary ammonium functional group. The novel polymer has improved chemical and mechanical stability as compared to the state-of-the-art materials for incorporation in anion exchange membrane. The disclosed anion exchange ionomer may be incorporated into an anion exchange membrane and used in electrochemical applications.

16 Claims, 7 Drawing Sheets

(56) References Cited

U.S. PATENT DOCUMENTS

2022/0072529 A1\* 3/2022 Lee ........................ B01D 69/02
2022/0266239 A1\* 8/2022 Bae ..................... H01M 8/1072

\* cited by examiner

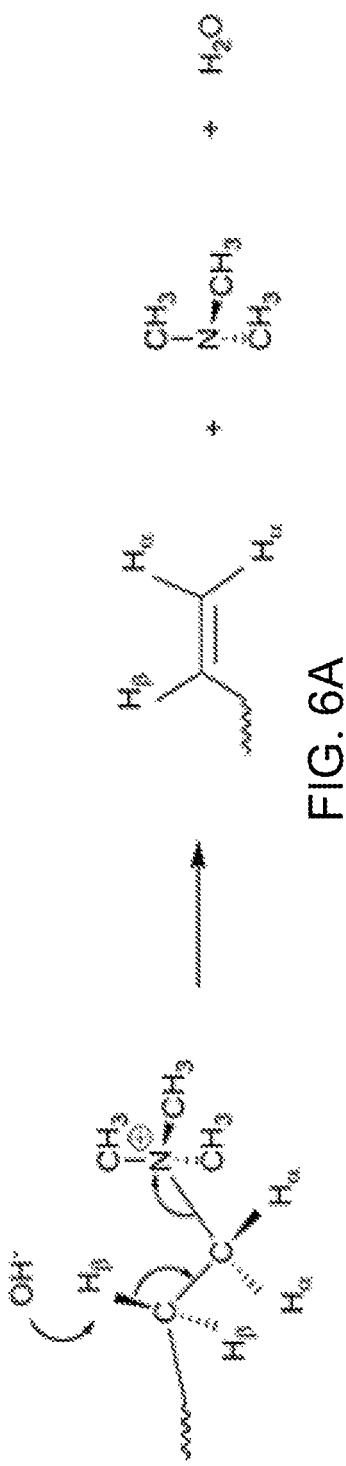
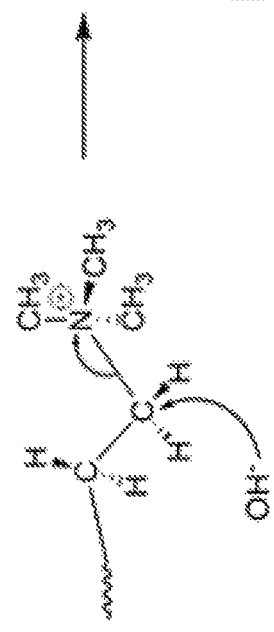
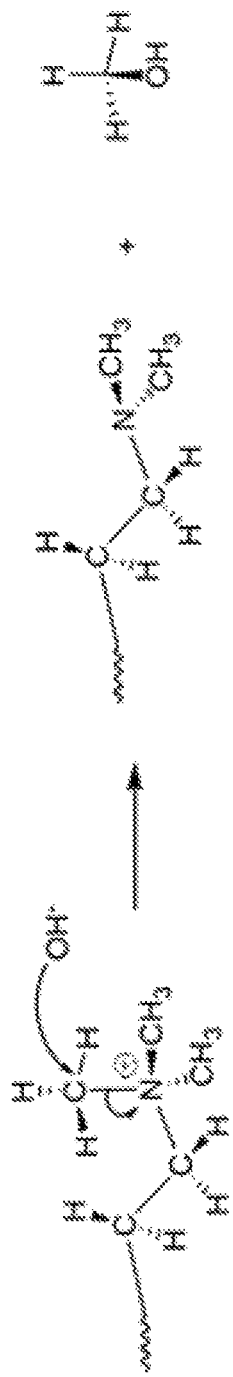
FIG. 6A
FIG. 6B
FIG. 6C
Hagesteijn, K. F.; Jiang, S.; Ladewig, B. P., A review of the synthesis and characterization of anion exchange membranes. *Journal of materials science* 2018, *53* (16), 11131-11150

ANION EXCHANGE IONOMER WITH A POYARYLENE BACKBONE AND ANION EXCHANGE MEMBRANE INCORPORATING SAME

CROSS REFERENCE TO RELATED APPLICATIONS

This application is a continuation in part of U.S. patent application Ser. No. 16/789,346, filed on Feb. 12, 2020, which claims the benefit of provisional patent application No. 62/804,634, filed on Feb. 12, 2019, and this application is a continuation in part of Ser. No. 16/913,767, filed on Jun. 26, 2020, which claims the benefit of priority to U.S. provisional patent application No. 62/867,146, filed on Jun. 26, 2019, and this application claims the benefit of priority to U.S. provisional patent application No. 63/047,808, filed on Jul. 2, 2020; the entirety of which is hereby incorporated by reference.

BACKGROUND OF THE INVENTION

Field of the Invention

This invention is directed to a novel anion exchange ionomer (AEI) incorporating a fluorinated ether functional group with a stable backbone for use as an anion exchange material, with enhanced mechanical and chemical stability compared to state of the art. Such materials are well suited for use in anion exchange membranes. Some of the structures provided can be optionally modified for use as cation exchange materials and bipolar membranes

Background

Anion exchange membranes (AEM) are more attractive than proton exchange membranes for applications such as fuel cells and electrolyzers because nonprecious metals can be used in place of precious metal catalysts. Unfortunately, most current anion exchange membranes suffer from poor stability in highly basic environments. This instability is primarily caused by two factors: degradation of the polymer backbone and degradation of the functional cationic groups.

Most AEM materials comprise of a backbone selected from the group of polysulfones, poly(phenylene oxide)s, poly(phenylene)s, poly(benzimidazolium)s, poly(arylene ether ketone)s, and poly(arylene ether sulfone)s. These polymers contain an arylene ether linkage in the mid-chain. These have been found to be chemically unstable and degrade easily under highly alkaline conditions. The hydroxyl ions and any radicals formed during the reaction cleave the ether bond causing the polymer to unzip. This unzipping leads to break down of the membrane structure and loss of mechanical strength and conductivity.

The main drawback of quaternary ammonium functional groups in AEMs is the poor chemical stability due to the ammonium group's susceptibility to OH-attack, leading to ammonium group degradation and reduction of IEC. The OH-attack occurs via one of the following reaction pathways: e β-hydrogen (Hoffman elimination), nucleophile substitution (SN2) or ylide intermediate formation. FIGS. 1A, 1B and 1C highlight the respective degradation reaction pathways. Given that all these reactions can be initiated by nucleophiles such as OH—, the high-pH environment in AEMFC/AEMWE makes it inevitable that the QA will be degraded over time. For many applications, long term stability is a critical issue.

Anion exchange membranes (AEMs) in fuel cells are solid polymer electrolyte membranes which transport anions (e.g. OH, $HCO_3^-$) under an electrical potential. AEM is a critical component for direct ammonia fuel cells (DAFCs), where ammonia and oxygen are used to generate electricity together with nitrogen as a byproduct. Ammonia is an ideal carbon-free fuel for fuel cells and offers a reliable and clean source of energy, without many of the problems associated with the traditional hydrogen economy. Compared to proton exchange membrane fuel cells, DAFCs have attracted recent interest due to their potential to eliminate the requirement for expensive platinum-group catalysts, fluorinated ionomers, and acid-resistant metals in the system. The chemical reactions in DAFC are as follows:

$$\text{Cathode: } O_2 + 2H_2O + 4e^- \rightarrow 4OH^- \quad (1)$$

$$\text{Anode: } 2NH_3 + 6OH^- \rightarrow N_2 + 6H_2O + 6e^- \quad (2)$$

$$\text{Overall: } 4NH_3 + 3O_2 \rightarrow 2N_2 + 6H_2O \quad (3)$$

To achieve high ionic conductivity and hydrophilic-domain phase separation, AEMs for DAFCs are designed to have high ion exchange capacity (IEC). High IEC also increases the water uptake and reduces the mechanical strength and dimensional stability in AEMs. To solve these issues, thicker membranes are traditionally used. However, thicker AEMs have higher ionic resistance, lowering the electrochemical performance in a device. To achieve a thin, dimensionally-stable AEM with low resistance, inert reinforcement must be explored.

However, a critical issue with thin AEMs is fuel (in the case of a DAFC, i.e. ammonia) crossover across the membrane during operation. Crossover results in both degradation of the membrane and reduced cell performance in terms of open circuit voltage and efficiency. Crossover in an electrochemical cell is often characterized by electrochemical methods and is described as a crossover current density. For low temperature DAFC based on polymeric membrane electrolytes, the real challenge is how to minimize the crossover of ammonia. Novel chemical and coating structure design for anion exchange polymer and AEM become the key for its application in DAFCs.

In the case of anion exchange polymers, various cationic functional groups grafted to the same polymer backbone can exhibit various degrees of fuel crossover and/or ionic conductivity. For example, an anion exchange polymer may contain a tetramethylammonium functional group to provide certain anion exchange capacity. Substitution of this functional group with a pyridinium or piperidinium functional group may result in varying ammonia crossover and/or ionic conductivity. Besides, various polymer backbone and molecular weight can also exhibit various degrees of ammonia crossover. In the case of AEM, multilayer structure design will also result in reducing ammonia crossover.

The anion conducting membrane may be made much thinner and durable with the use of a microporous support scaffold, wherein the anion polymer is coated onto or at least partially into the microporous support scaffold. A microporous support scaffold may be microporous polyethylene, polypropylene, and polytetrafluoroethylene, such as expanded polytetrafluoroethylene (ePTFE) membrane, for example. An ion conducting membrane and the microporous support scaffold may be any suitable thickness including about 20 microns or less, and preferably 10 microns or less, and even more preferably about 5 microns or less.

There is therefore an urgent need for inexpensive, chemically stable AEM to enable the performance and durability for developing fuel cells including DAFCs.

SUMMARY OF THE INVENTION

The present invention provides an anion exchange ionomer and an anion exchange membrane and incorporation said ionomer with enhanced mechanical and chemical stability compared to the state of the art.

An exemplary anion exchange ionomer has a partially fluorinated or fully fluorinated backbone to enhance the chemical stability of the backbone. The backbone of the fluorinated polymer should contain no ether linkages, as ether linkage free backbones were developed for anion exchange membranes to obtain improved alkaline stability. This backbone is very stable because there are no C—O bonds.

An exemplary anion exchange ionomer has a polyarylene structure, such as a phenyl group. An exemplary anion exchange ionomer is comprised of a fluorinated carbon chain, preferably containing sp2 carbons. An exemplary anion exchange ionomer may comprise Polyphenylenes, fluorinated hydrocarbon or carbon-based polymers.

One of the degradation mechanisms for the functional group is the Hoffman elimination mechanism, where a nucleophile (OH—) attacks the β-hydrogen, which causes loss of the functional group and reduction in IEC. One of the solutions to reduce or eliminate the Hoffman elimination mechanism is to synthesize the fluorine based quaternary ammonium cations in place of β-hydrogen quaternary ammoniums. The multiple carbon-fluorine bonds in the fluorine based quaternary ammonium cations also strengthen the "skeletal" carbon-carbon bonds from the inductive effect which would eliminate the degradation due to the SN2 mechanism.

There are two mechanistic models for how an alkyl halide can undergo nucleophilic substitution. In a first model, the reaction takes place in a single step, and bond-forming and bond-breaking occur simultaneously, $S_N2$ mechanism. The term $S_N2$, S stands for 'substitution', the subscript N stands for 'nucleophilic', and the number 2 refers to the fact that this is a bimolecular reaction.

An exemplary side chain contains a functional group that is either partially or fully fluorinated; this will eliminate all the degradation mechanisms of nucleophilic attack on the functional group. Preferably, the functional groups are fully fluorinated as they are more stable chemically and thermally. Fluorine forms the strongest single bond to carbon. Fluorocarbons are more chemically and thermally stable than their corresponding hydrocarbon counterparts, and indeed any other organic compound.

Exemplary anion exchange polymers may have functional groups selected from the group of quaternary ammonium, tertiary diamines, phosphonium, benz(imidazolium), sulphonium, guanidinium, metal cations, pyridinium. Preferably the functional group is quaternary ammonium.

An exemplary anion exchange membrane may be a composite anion exchange membrane comprising a porous scaffold support. An anion exchange polymer may be coupled to the porous scaffold, such as by being imbibed into the pores of the porous scaffold. The porous scaffold may enable the composite anion exchange membrane to be ultra-thin and therefore reduce water management issues. An ultra-thin anion exchange membrane may have a thickness of about 50 µm or less, about 30 µm or less, about 25 µm or less, about 10 µm or less, and may even be as thin as about 5 µm or less. An exemplary porous scaffold support is selected from the group comprising expanded polytetrafluoroethylene (ePTFE) or polyolefins. Exemplary polyolefins include polypropylene, polyethylene, and polyether ether ketone.

Anion exchange membranes as described herein may be use in anion exchange membrane fuel cells, electrolyzers, sensors, compressors, batteries, super capacitors.

Examples

A polyarylene, such as triphenyl or biphenyl, is reacted with 2-Bromo-1,1,2,2-tetrafluoroethyl trifluorovinyl ether in the presence of a strong acid to form a bromoalkylated precursor polymer; The bromoalkylated precursor polymer is reacted with a trialkylamine and sodium hydroxide to form a polyarylene having a backbone free of ether linkages. The strong acid may have to have a pH of about 2 or less, about 1 or less, about 0.5 or less and any range between and including the pH listed. An exemplary strong acid is triflic acid.

The present invention provides a mechanically reinforced anion exchange membrane comprising one or more layers of functional polymer based on a terphenyl backbone with quaternary ammonium functional groups and an inert porous scaffold material for reinforcement. Typically, the present invention describes an anion exchange membrane comprising multilayers of anion exchange polymers which each contain varying types of backbones, varying degrees of functionalization, or varying functional groups to reduce ammonia crossover through the membrane. Typically, the membrane consists of at least two layers with varying properties. Typically, the thickness of anion exchange membrane is 30 microns or less, more typically 15 microns or less, and in some embodiments 5 microns or less A fluorinated carbon chain, such as TFE, is reacted with 2-Bromo-1,1,2,2-tetrafluoroethyl trifluorovinyl ether in the presence of an initiator and/or a strong acid to form a bromoalkylated precursor polymer; The bromoalkylated precursor polymer is reacted with a trialkylamine and sodium hydroxide to form a perfluorinated anion exchange ionomer having a backbone free of ether linkages.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Anion exchange polymers described in this invention is composed of an aromatic/polyaromatic ring in polymer backbone (e.g. biphenyl, terphenyl, fluorenyl) and a tethered alkyl halide (e.g. bromide) side chain which can be converted to quaternary ammonium hydroxide groups.

In one embodiment, a membrane is prepared by dissolving p-TPN1-Pyr in DMF at a 10% weight ratio i.e. 0.3 grams of polymer to 9.7 g of solvent. The mixture was stirred until homogenous and translucent.

The anion exchange polymer solution was then applied to a microporous polyethylene material tensioned around a chemically-resistant plastic frame. The polymer solution was then poured on to the microporous scaffold. The frame was covered with a lid to slow down the solvent evaporation process. The membrane was dried at 60-degree C. The final thickness of the anion exchange membrane was 15 microns.

In another embodiment, a membrane is prepared by dissolving p-TPN1-TMA in DMF at an 8% weight ratio i.e. 0.8 grams of polymer to 9.2 g of solvent. The mixture was stirred until homogenous and translucent.

The anion exchange polymer was then applied to a microporous poly(tetrafluoroethylene) material with a doctor blade. The membrane was dried at room temperature. The final thickness of the membrane was 6 microns.

In another embodiment, a membrane is prepared by providing two distinct solutions of TPN polymers of various functional groups in DMF (e.g. m-TPN1-TMA and m-TPN1-Pip) along with a porous reinforcement material. The porous reinforcement material is coated on one side with the first solution with a doctor blade and then dried. Then, the porous reinforcement material is coated on the second side with the second solution and then dried, filling the remainder of the pores in the reinforcement material and creating a multilayer reinforced anion exchange membrane. The final thickness of the membrane was 10 microns.

It will be apparent to those skilled in the art that all the embodiment discussed above can be scaled up to a roll-to-roll continuous coating process.

The present invention provides an anion exchange membrane that is ultra-thin and comprises functional additives to provide improved water management. An exemplary anion exchange membrane may be a composite anion exchange membrane comprising a porous scaffold support. An anion exchange polymer may be coupled to the porous scaffold, such as by being imbibed into the pores of the porous scaffold. The porous scaffold may enable the composite anion exchange membrane to be ultra-thin and therefore reduce water management issues. An ultra-thin anion exchange membrane may have a thickness of about 50 µm or less, and may even be as thin as about 5 µm or less. An exemplary anion exchange polymer may include a functional polymer based on a hydrocarbon backbone with quaternary ammonium functional groups and an inert porous scaffold material for reinforcement. The functional additives may contribute to increase water production, water retention, back-diffusion and reduce the gas crossover.

The combination of ultra-thin and functional additives provides a unique combination of features that enables anion exchange membranes to operate without supplemental humidification methods. A porous scaffold supports the anion exchange polymer to make the composite dimensionally stable and durable for processing. Very thin and ultra-thin anion exchange membranes may however be susceptible to high gas crossover rates across the membrane during operation. The gas crossover rates become a serious issue for ultra-thin AEMs because polymeric membranes have inherent gas diffusivity and permeability properties. These crossover rates are reduced by the addition of a functional additive. Reactant gases that permeate into the membrane react with the functional additive and produce water. The reactant gasses may include oxygen and/or hydrogen. Furthermore, reactant gasses can have other detrimental effects to the anion exchange membrane including reacting with the anion exchange polymer and/or the reacting with the porous scaffold to reduce strength and durability.

An exemplary functional additive may comprise a reactive species, including a catalyst that reacts with oxygen or hydrogen, a plasticizer, a hygroscopic material and/or a radical scavenger. The functional additives may be included in the anion exchange membrane in a concentration of about 1% by weight or less, about 0.5% or less and in some cases about 0.1 wt % or less, and any range between and including the concentrations provided. Too much of reactive functional additives will decrease the performance of the system.

An exemplary reactive species includes, but is not limited to, $TiO_2$, $CeO_2$, $SiO_2$, carbon nanotubes, graphene, carbon black, sulfated zirconia and any combination of them. Note that the reactive species may be included as a particle in the anion exchange polymer and/or may be coupled to the porous scaffold, such as being bound in an expanded polytetrafluoroethylene, or coated onto a porous scaffold, wherein the reactive species is exposed to the anion exchange polymer at the interface between the ionomer and the porous scaffold.

The reaction of permeated may be catalyzed by the catalytic functional additive, such as platinum particles to generate water, which in turn is adsorbed and retained by the oxide particles (e.g. $SiO_2$). Moreover, the addition of $TiO_2$ enhances the back-diffusion of water that is generated by the electrochemical reaction from the cathode to the anode, owing to the hygroscopic property of $TiO_2$. Thus, the membrane at the cathode side that is dried by the electro-osmotic drag can be humidified effectively. A catalytic functional additive is a subset of a reactive species but is not consumed in the reaction. A catalyst reduces activation energy for a reaction to occur.

Functional additives may include plasticizers that increase the amorphous content of the anion exchange polymer. This increases the free volume for water to occupy, which enhances ion conductivity. Too much plasticizer decreases the glass transition temperature. Exemplary Plasticizers are selected from the group consisting of 1-Butyl-3-methylimidazolium hexafluorophosphate (BMIMPF6), 1-Hexyl-3-methylimidazolium bis(trifluoromethanesulfonyl) imide (MC6), glycerol, and Nylon 6,6.

Functional additives may include fillers such as a hygroscopic material that retain water in the membrane to improve conductivity. Exemplary fillers may include Aluminium oxide (Al2O3), Heteropolyacid (HPA)-based inorganic filler, IL-functionalised carbon materials, Carbon black (CB), Multiwallcarbon nanotubes (MWCNTs) and Reduced Graphene Oxide (RGO), Phosphoric acid-modified silica, Imidazole-modified silica, Phosphate-modified titanium zirconium oxide, and Zeolitic imidazolate framework-8 (ZIF-8).

Functional additives may include radical scavengers that improve durability of the membrane because they convert radicals into non-harmful species, which protects the anion exchange polymer or ionomer. Exemplary radical scavengers include, but are not limited to metal oxides including cerium oxide, manganese oxide, and polymers including polydopamine.

The reaction of permeated may be catalyzed by the platinum particles to generate water, which in turn is adsorbed and retained by the oxide particles (e.g. $SiO_2$). Moreover, the addition of $TiO_2$ enhances the back-diffusion of water that generated by the electrochemical reaction from the cathode to the anode, owing to the hygroscopic property of $TiO_2$. Thus the membrane at the cathode side that dried by the electro-osmotic drag can be humidified effectively.

Exemplary anion exchange polymers may have backbones selected from the group of Polysulfones, Polyphenylenes, Poly(arylene ether ketones), Poly(phenylene oxides), Polystyrenes, Polynorbornenes, Polybenzimidazoliums, Polypropylenes, Polyethylenes, and fluorinated hydrocarbon or carbon-based polymers. Exemplary anion exchange polymers may have functional groups selected from the group of quaternary ammonium, tertiary diamines, phosphonium, benz(imidazolium), sulphonium, guanidinium, metal cations, pyridinium.

Anion exchange membranes as described herein may be use in AEMFCs, electrolyzes, sensors, compressors, batteries, super capacitors.

Examples

In one embodiment, a membrane is prepared by dissolving the anion exchange polymer in isopropyl alcohol at a 3% weight ratio, i.e. 0.3 grams of polymer to 9.7 grams of solvent. Then 0.06 grams of $TiO_2$, 0.2 grams of $SiO_2$ and 0.01 grams Pt Black are added into the solution. The mixture was stirred until homogenous.

The polymer solution was then applied to a microporous polyethylene material tensioned around a chemically resistant plastic frame. The polymer solution was then poured on to the microporous scaffold. The frame was covered with a lid to slow solvent evaporation. The membrane was dried at room temperature. The final thickness of the membrane was 5 micrometers.

In another embodiment, a membrane is prepared by dissolving the polymer in isopropyl alcohol at a 5% weight ratio i.e. 0.5 grams of polymer to 9.5 g of solvent. Then 0.06 grams of $CeO_2$, 0.25 grams of $SiO_2$ and 0.01 grams carbon nanotubes are added into the solution. The mixture was stirred until homogenous.

The polymer was then applied to a microporous poly(tetrafluoroethylene) material with a doctor blade. The membrane was dried at room temperature. The final thickness of the membrane was 10 microns.

It will be apparent to those skilled in the art that the latter embodiment can be scaled up to a roll-to-roll, continuous process.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIGS. 6A, 6B, and 6C show degradation mechanisms of quaternary ammonium functional groups.

DETAILED DESCRIPTION OF THE ILLUSTRATED EMBODIMENTS

Figure 1:
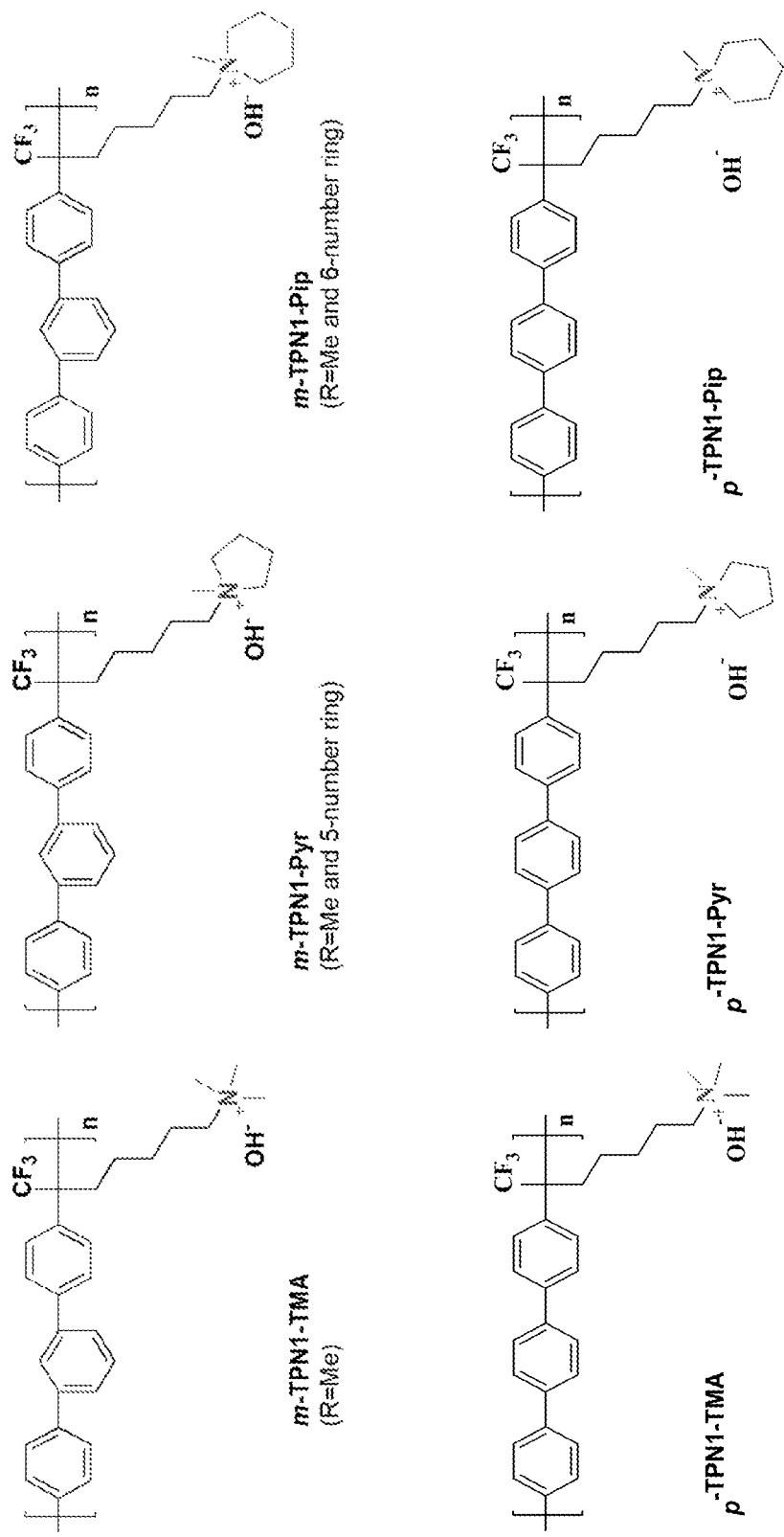
FIG. 1 shows representative examples of anion exchange polymers disclosed in this invention

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Figure 2:
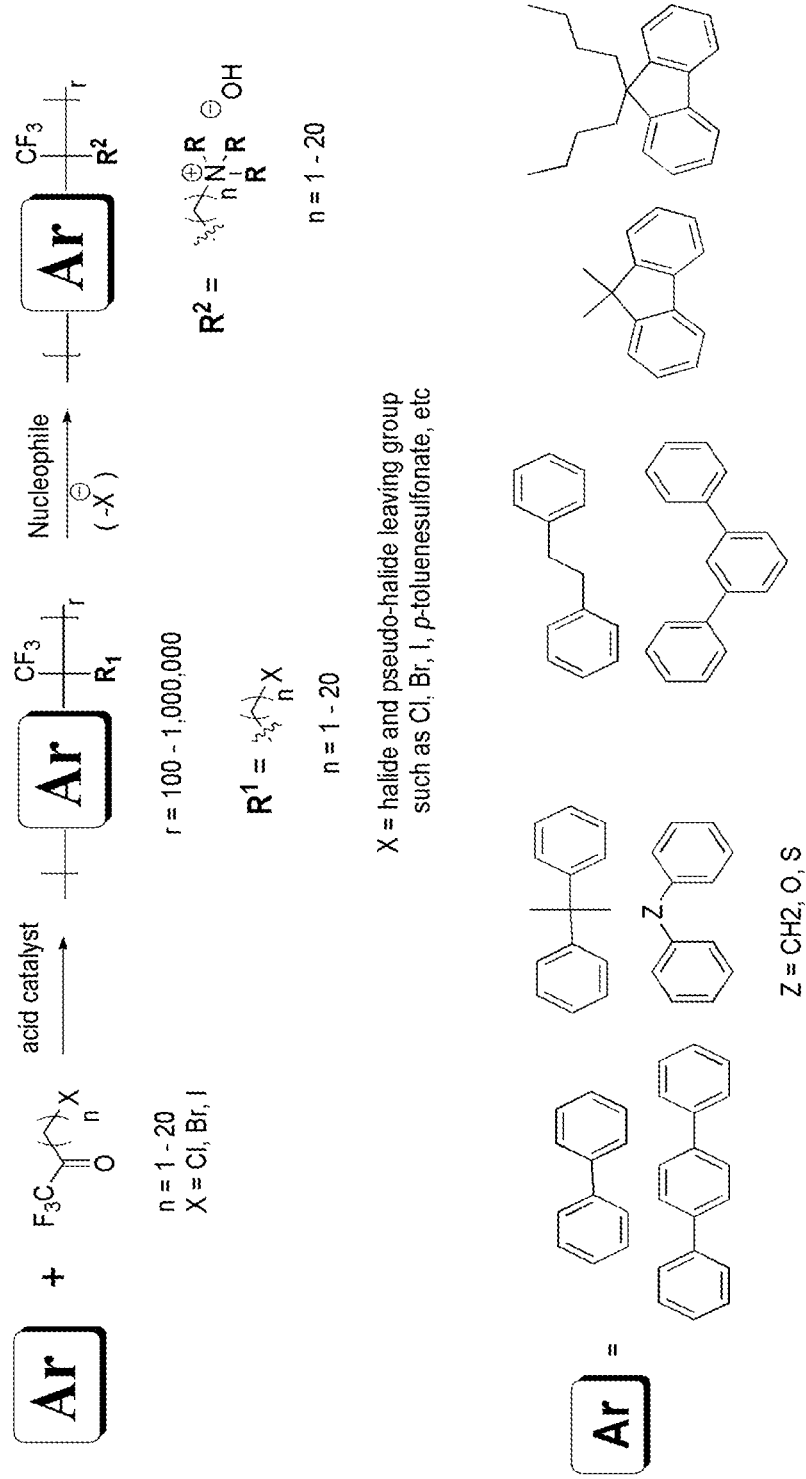
FIG. 2 shows representative examples of anion exchange polymers disclosed in this invention

FIGS. 1 and 2 shows the chemical structure of exemplary anion exchange polymers of the present invention.

Figure 3:
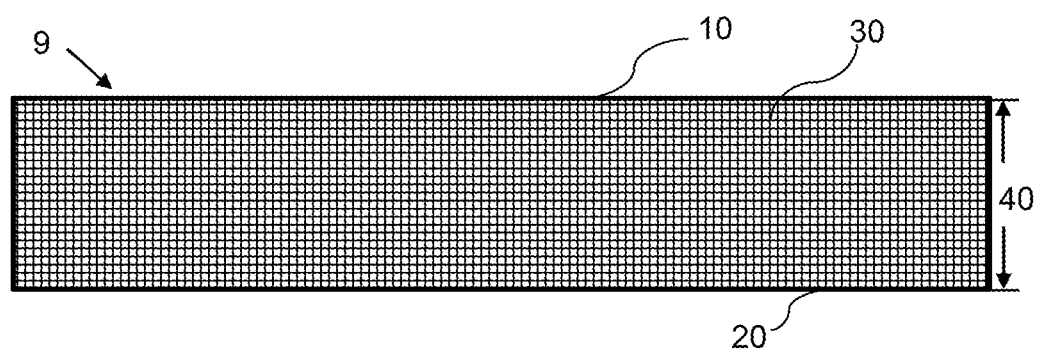
FIG. 3 shows an exemplary porous scaffold reinforcement material employed in the present invention.

FIG. 3 shows an exemplary cross-sectional diagram of porous scaffold 9 has a thickness 40 from a first side 10 and an opposite second side 20. The porous scaffold has pores 30 and an open structure from the first side 10 to the second side 20, allowing for an appropriate fluid to flow from the first to the second side. The porous scaffold is air permeable.

Figure 4:
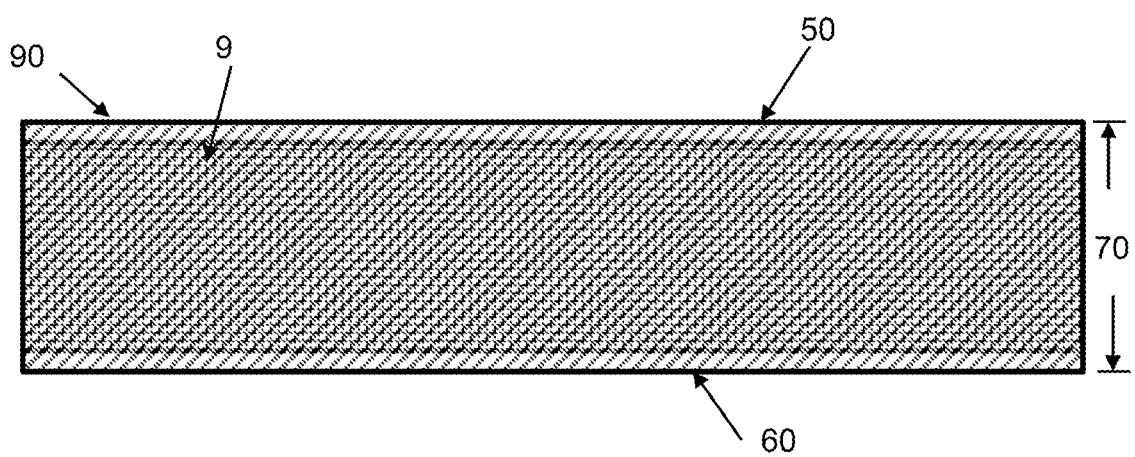
FIG. 4 shows an exemplary anion exchange membrane formed from imbibing an anion exchange polymer into a porous scaffold reinforcement material.

FIG. 4 shows a cross-sectional diagram of an anion exchange membrane 90 comprising a porous scaffold 9 imbibed with an anion exchange polymer 70 which contributes ionic conductivity. The anion exchange polymer forms surface layers 50 and 60 on the two faces of the imbibed porous scaffold.

Figure 5:
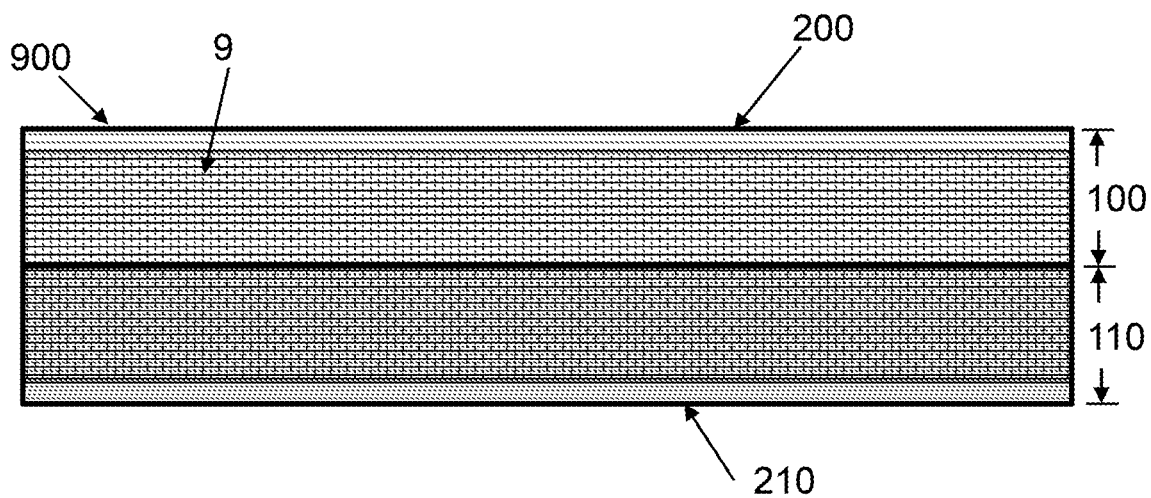
FIG. 5 shows an exemplary anion exchange membrane formed from imbibing two various anion exchange polymers into a porous scaffold reinforcement material.

FIG. 5 shows a multilayered anion exchange membrane 900 comprise a first layer 100 comprising an anion exchange polymer with a functional group 200 and a second layer 110 comprising another anion exchange polymer with a second functional group 210, both imbibed into the porous scaffold 9.

FIGS. 6A, 6B and 6C highlight the respective degradation reaction pathways. Given that all these reactions can be initiated by nucleophiles such as OH—, the high-pH environment in AEMFC/AEMWE makes it inevitable that the QA will be degraded over time.

Figure 7:
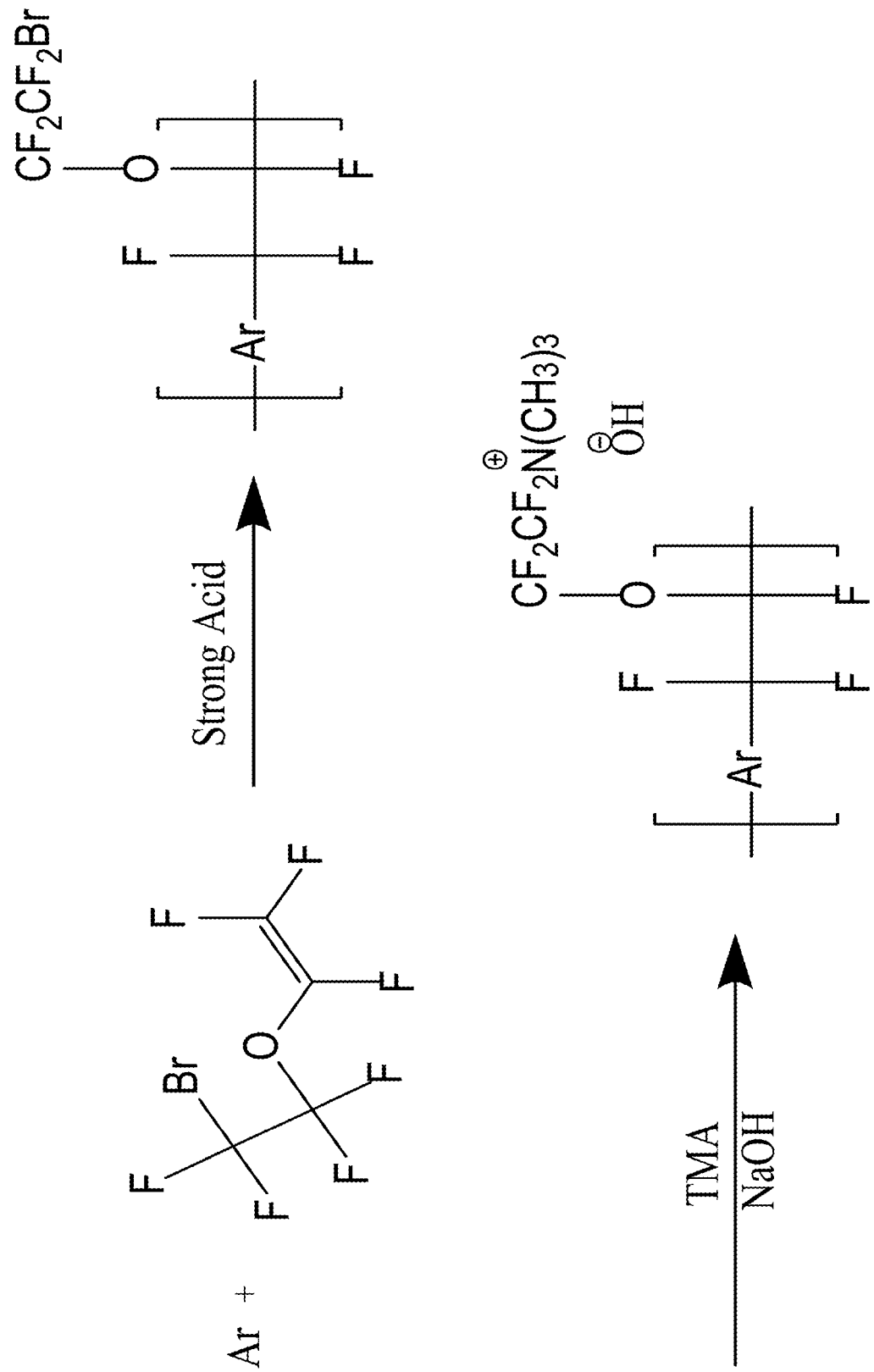
FIG. 7 shows the reaction mechanism for forming a polyarylene-based anion exchange ionomer.

As shown in FIG. 7, an aromatic compound reacts in the presence of a strong acid with 2-Bromo-1,1,2,2-tetrafluoroethyl trifluorovinyl ether to form bromoalkylated precursor polymer. The bromoalkylated precursor polymer is reacted with a trialkylamine (TMA) and sodium hydroxide to form a perfluorinated anion exchange ionomer having a backbone free of ether linkages.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

What is claimed is:

1. An anion exchange ionomer comprising:
    a) a polyphenylene backbone bonded with a fluorinated alkyl halide;
    b) a side chain comprising said fluorinated alkyl halide; and
    c) a quaternary ammonium functional group bonded to the fluorinated alkyl halide of said side chain.

2. The anion exchange ionomer of claim 1, wherein the backbone comprises a tetrafluoroethylene compound.

3. The anion exchange ionomer of claim 1, wherein the backbone comprises a polyphenylene compound.

4. An anion exchange membrane comprising the polymer of claim 1 and a porous scaffold.

5. The anion exchange membrane of claim 4, wherein the porous scaffold is comprises poly(tetrafluoroethylene).

6. The anion exchange membrane of claim 5, wherein the porous polytetrafluoroethylene is expanded polytetrafluoroethylene.

7. The anion exchange membrane of claim 4, wherein the porous scaffold is selected from the group consisting of: polyethylene, polypropylene, polyether-ether-ketone (PEEK), and poly(tetrafluoroethylene).

8. The ion exchange membrane of claim 7, wherein a thickness of the exchange membrane is no more than 50 µm.

9. The ion exchange membrane of claim 7, wherein a thickness of the exchange membrane is no more than 25 µm.

10. A method of making the anion exchange ionomer of claim 1, comprising:
   a) reacting polyphenylene with fluoroalkyl ketone in the presence of a strong acid having a pH of no more than 2.0;
   b) converting a terminal group of said side chain to quaternary ammonium hydroxide group.

11. The method of making the anion exchange ionomer of claim 10, wherein the strong acid has a pH of no more than 1.0.

12. The method of making the anion exchange ionomer of claim 10, wherein the strong acid has a pH of no more than 0.5.

13. The method of making the anion exchange ionomer of claim 10, wherein the strong acid triflic acid.

14. The anion exchange ionomer of claim 1, comprising a pyridinium functional group.

15. The anion exchange ionomer of claim 1, comprising a piperidinium functional group.

16. The anion exchange ionomer of claim 1, comprising a tetramethylammonium functional group.

* * * * *